United States Patent [19]

Reichle

[11] Patent Number: 4,738,626
[45] Date of Patent: Apr. 19, 1988

[54] ASSEMBLY ADAPTER FOR CONNECTING COAXIAL CABLES

[75] Inventor: Hans Reichle, Wetzikon, Switzerland

[73] Assignee: Reichle + De Massari AG Elektro-Ingenieure, Wetzikon, Switzerland

[21] Appl. No.: 847,431
[22] Filed: Apr. 2, 1986

[30] Foreign Application Priority Data

Apr. 12, 1985 [CH] Switzerland ............ 01569/85

[51] Int. Cl.⁴ ........................................... H01R 13/74
[52] U.S. Cl. ........................................... 439/553
[58] Field of Search ............... 339/122 R, 123, 126 R, 339/126 J, 126 RS, 128, 129, 130 R, 130 C; 411/166, 176, 177, 180; 439/544, 552-555

[56] References Cited

U.S. PATENT DOCUMENTS

| | | | |
|---|---|---|---|
| 2,700,144 | 1/1955 | Flanagan, Jr. .................... | 339/126 J |
| 3,534,321 | 10/1970 | Malachowski .................. | 339/126 R |
| 4,451,106 | 5/1984 | Wiseheart et al. ............... | 339/128 |
| 4,460,233 | 7/1984 | Newton et al. ................... | 339/128 |
| 4,477,141 | 10/1984 | Hardesty ........................... | 339/123 |
| 4,488,844 | 12/1984 | Baubles ............................ | 411/177 |

FOREIGN PATENT DOCUMENTS 12868 12/1956 Fed. Rep. of Germany ... 339/130 C

Primary Examiner—John McQuade
Attorney, Agent, or Firm—Karl F. Ross; Herbert Dubno

[57] ABSTRACT

An adapter assembly for the connection of coaxial cables in which an adapter body having a rear side is formed with at least one pass-through opening, and at least two hook-shaped catch fingers projecting from the rear side adjacent the opening and whose hooks open toward one another. A respective socket is received in the opening and formed with a polygonal limiting flange resting against the rear side and retained by a snap-action grip of the catch fingers over the flange so that the hooks engage a rear side of the flange, the hook-shaped catch fingers having a diametrical spacing from one another across the opening substantially equal to a spacing across the flange between opposite sides thereof. Torsion force takeup for coupling or decoupling with the socket is ensured by a pair of bars or projections from the rear side which engage the preferably hexagonal flange and are offset from the fingers.

4 Claims, 1 Drawing Sheet

ASSEMBLY ADAPTER FOR CONNECTING COAXIAL CABLES

FIELD OF THE INVENTION

The present invention relates to an adapter for connecting coaxial cables in low-current and distributor circuits and forming a feedthrough with at least one cable socket for a coaxial connector, with the socket having a polygonal, in particular hexagonal, limiting flange on its cable or rear side, which, if required, interacts with a lock nut on the coupling or front side.

BACKGROUND OF THE INVENTION

In coaxial cable distributing systems of low-current installations, for example telephone installations, a large number of coaxial connectors each with a cable socket and a cable plug, adapted to be quickly detachable from one another by means of bayonet catches, are as a rule required per installation. All cable sockets are rigidly connected to the distributor circuits and each cable socket is passed through a suitable pass-through opening in the usual mounting plate or bar on the distributor frame and there bolted. Accordingly, the cable socket has a hexagonal limiting flange on the rear side which interacts with a lock nut on the front side.

This kind of attachment of the cable sockets of the coaxial connectors on the mounting bars is wearisome and time-consuming especially when the sockets are densely oriented (i.e. placed very close together), as the retention of the limiting flange with a suitable spanner is hardly possible. On the other hand, however, a cable socket must be mounted so tightly that the cable plug may be coupled and uncoupled as often as desired without the cable plug twisting, as otherwise there is a danger of twisting off the coaxial cable.

OBJECTS OF THE INVENTION

It is thus an object of the present invention to provide adapter for connecting coaxial cables, with which the cable sockets can be easily and quickly mounted even in a dense relationship with sufficient protection against torsion for any desired amount of coupling and uncoupling being guaranteed.

It is also an object to provide such an adapter so that it also will be splitable for concealed boxes and the like for house antenna connections and the like with coaxial cable sockets.

SUMMARY OF THE INVENTION

These objects are achieved according to the invention by providing at least two catches which protrude from the body of the adapter on the rear side and near the edge of the respective pass-through opening for the cable socket. The catches are situated diagonally opposite each other and are designed for the snap, rear-gripping engagement of the limiting flange of the pass-through cable socket.

Thus the cable socket may be "klick"-fastened or snap fastened without screws by engagement with the catches, and the catches themselves can provide a certain protection against torsion. Hence the lock nut can be tightened without having to counter hold the limiting flange, particularly when the diagonal spacing between the catches corresponds to the width between flats across the limiting flange.

The lock nut itself can be completely dispensed with, however, while affording an optimal protection against torsion when in a further specific embodiment of the adapter at least two limiting means protrude from the rear side of the body of the adapter, are disposed diametrically opposite each other across the opening, and have a diametrical spacing corresponding to the width between opposing flats across the limiting flange of the cable socket.

The arrangement can be such that the limiting means are bars offset in the circumferential direction relative to the catches and which take any torsional force applied to the socket in coupling or uncoupling the cable socket. The limiting means can protrude parallel to the limiting face of the catches and can be elevations which take up the component force on the catches as well as the torsional force in coupling or uncoupling the cable sockets.

For a sufficient elasticity of the catches, in particular also to be able to spread them for a dismounting of the cable socket, it is advantageous when the root of the elastic arm of each catch is recessed in the body of the adapter.

For a utilization on the frame of the distributor system, it is advantageous when the assembly adapter is a bar-shaped body. For a direct or indirect attachment of the assembly adapter on multiple installation boxes or concealed connection boxes by means of screws or latches, a socket-shaped plastic body is advantageous. In this case it is of advantage when the indirect attachment of the adapter body takes place by means of a mounting ring with which the body is clamped.

In addition to this, it is advantageous when the assembly adapter consists of an injection molding of a suitable plastics.

SPECIFIC DESCRIPTION

Figure 1:
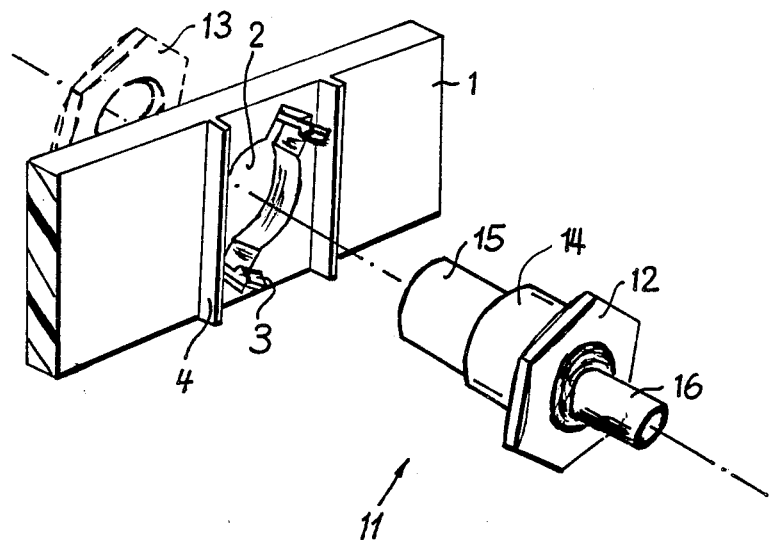
FIG. 1 is a diagrammatic exploded perspective view of an assembly adapter according to the invention with the cable socket of a coaxial connector.

The adapter according to FIG. 1 comprises a bar-shaped body 1 suitable for mounting on distributor systems, here shown only partially only one cable socket 11. Normally, such mounting bars or plates, which are screwed or snapped onto the distributor frame, are intended to accommodate a plurality of such cable sockets.

For the accommodation of a cable socket 1 of a commercial coaxial connector comprising a cable plug, not shown here, the assembly bar 1 has a respective pass-through opening 2 through which the cable socket 11 is fed from the rear side which, in the drawing, faces the viewer until the hexagonal limiting flange 12 abuts on the bar.

Thus far, such arrangements are known; in such known arrangements a lock nut 13 can be placed on the respective threaded portion 14 of the socket.

According to the invention, the lock nut can be dispensed with. In the adapter of the invention, two catches 3 protrude from the assembly bar 1 on the rear side and near the edge of the respective pass-through opening 2. These hook-shaped catches 3 are situated diagonally opposite each other for the snapping rear-gripping engagement over the limiting flange 12 of the passed-through cable socket 11. In addition to this, two bars 4, also situated diametrically opposite each other and displaced in circumferential direction relative to the catches 3, project from the rear surface of the body 1.

The respective arrangement of the catches 3 and the bars 4 is herewith dependent on the polygonal, here hexagonal, formation of the limiting flanges 12. The diagonal spacing between the catches 3 as well as the diametrical spacing between the bars 4 corresponds to the width between opposing flats across the limiting flange 12.

Figure 2:
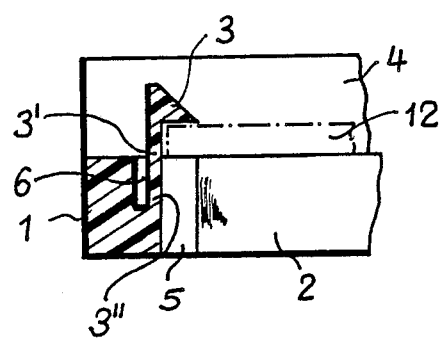
FIG. 2 is a partial section showing a detail of the assembly adapter according to FIG. 1, on a larger scale.

The root 3" of the elastic arm 3' of the catches 3 according to FIG. 2 is recessed below the rear surface of the assembly bar 1, which can be achieved by an incision 6. This facilitates insertion of the limiting flange 12 between the catches 3 and, if required, for spreading them apart dismounting of the socket. With regard to the opening 2, the catches 3 are in addition set back radially to correspond to the width across opposing flats of the limiting flange 12.

Moreover, the bars 4 can jut out somewhat over the catches 3 in order to align in advance and guide the flange 12 on a "blind" insertion of the flange between the catches 3.

Assembly adapters of the previously-mentioned kind are preferably injection molded of a suitable plastic.

While there are shown and described present preferred embodiments of the invention, it is to be distinctly understood that the invention is not limited thereto, but may be otherwise variously embodied and practiced within the scope of the following claims.

What is claimed is:

1. An adapter assembly for the connection of coaxial cables, comprising:
    an adapter body having a rear side and formed with:
    at least one pass-through opening, and
    at least two hook-shaped catch fingers projecting from said rear side adjacent said opening and whose hooks open toward one another;
    a respective socket received in said opening and formed with a hexagonal limiting flange resting against said rear side and retained by a snap-action grip of said catch fingers over said flange so that said hooks engage a rear side of said flange, said hook-shaped catch fingers having a diametrical spacing from one another across said opening substantially equal to a spacing across said flange between opposite sides thereof; at least two bars formed on said body and projecting from said rear side thereof flanking opposing sides of said flange and circumferentially spaced from said catch fingers, said bars having a diametrical spacing from one another across said opening substantially equal to the spacing across said flange between said opposite sides thereof and taking up torsional forces applied to said socket on coupling and uncoupling thereof.

2. An adapter assembly for the connection of coaxial cables, comprising:
    an adapter body having a rear side and formed with:
    at least one pass-through opening, and
    at least two hook-shaped catch fingers projecting from said rear side adjacent said opening and whose hooks open toward one another;
    a respective socket received in said opening and formed with a hexagonal limiting flange resting against said rear side and retained by a snap-action grip of said catch fingers over said flange so that said hooks engage a rear side of said flange, said hook-shaped catch fingers having a diametrical spacing from one another across said opening substantially equal to a spacing across said flange between opposite sides thereof; at least two elevations formed on said body and projecting from said rear side thereof and circumferentially spaced from said catch fingers and engaging said flange to take up torsional force applied to said socket on coupling and uncoupling thereof.

3. An adapter assembly for the connection of coaxial cables, comprising:
    an adapter body having a rear side and formed with:
    at least one pass-through opening, and
    at least two hook-shaped catch fingers projecting from said rear side adjacent said opening and whose hooks open toward one another; and
    a respective socket received in said opening and formed with a polygonal limiting flange resting against said rear side and retained by a snap-action grip of said catch fingers over said flange so that said hooks engage a rear side of said flange, said hook-shaped catch fingers having a diametrical spacing from one another across said opening substantially equal to a spacing across said flange between opposite sides thereof, each of said catch fingers being an elastic arm connected at a root thereof with said body, said roots of said catch fingers being recessed below the rear side of said body.

4. The adapter assembly defined in claim 3 wherein said body is composed of injection-molded synthetic resin.

* * * * *